(12) United States Patent
Aricha (10) Patent No.: US 12,498,698 B2
(45) Date of Patent: Dec. 16, 2025

(54) METHOD AND SYSTEM FOR REGULATING A MULTI-PART 3D PRINTING ORDER TRANSFER (71) Applicant: Siemens Industry Software Inc., Plano, TX (US)

(72) Inventor: Yahel Aricha, Givat Shmuel (IL)

(73) Assignee: Siemens Industry Software Inc., Plano, TX (US)

( * ) Notice: Subject to any disclaimer, the term of this patent is extended or adjusted under 35 U.S.C. 154(b) by 654 days.

(21) Appl. No.: 17/898,657

(22) Filed: Aug. 30, 2022

(65) Prior Publication Data

US 2024/0069521 A1 Feb. 29, 2024

(51) Int. Cl.
*G06Q 30/00* (2023.01)
*G05B 19/4099* (2006.01)
*G06Q 10/0631* (2023.01)
*G06Q 30/0283* (2023.01)
*G06F 30/20* (2020.01)
(Continued)

(52) U.S. Cl.
CPC ... *G05B 19/4099* (2013.01); *G06Q 10/06315* (2013.01); *G06Q 10/06316* (2013.01); *G06Q 30/0283* (2013.01); *G05B 2219/49023* (2013.01); *G06F 30/20* (2020.01); *G06Q 30/0611* (2013.01); *G06Q 30/0621* (2013.01); *G06Q 50/04* (2013.01)

(58) Field of Classification Search
CPC .................................................. G05B 19/4099
See application file for complete search history.

(56) References Cited

U.S. PATENT DOCUMENTS 6,330,542 B1 * 12/2001 Sevcik ............. G06Q 10/06316
705/400
9,636,871 B2 * 5/2017 Butler ................... B29C 64/386
(Continued)

FOREIGN PATENT DOCUMENTS

WO 2015026749 A1 2/2015

OTHER PUBLICATIONS

Makanda, Inno Lorren Désir, et al. "A multi-part production planning system for a distributed network of 3D printers under the context of social manufacturing." Machines 10.8 (2022): 605.*

*Primary Examiner* — Kathleen Palavecino
(74) *Attorney, Agent, or Firm* — Laurence A. Greenberg; Werner H. Stemer; Ralph E. Locher (57) ABSTRACT

Systems and a method for regulating a multi-part 3D printing order transfer between at least one requesting unit and a plurality of supplying units. Access to a nesting module is received. A quote module is defined for providing a price quote for a printing order based on material cost and on production cost. At least a portion of the production cost is calculated based on required build portion and on selected printing job type. For each supplying unit, it is received data on supplier auto-quote profile. Aata on a multi-part order of N parts requested by the requesting unit. For each relevant supplying unit and by using said two modules customized in via the auto-quote profiles, it is calculated a supplier quote to the nestable part subset, by applying the customized quote module—with the identified build portion size and with the type of the identified jobs as module input parameters. Supplying units are identified and the 3D printing order transfer is regulated by matching a selected set of supplying units to the requesting unit.

16 Claims, 3 Drawing Sheets

(51) Int. Cl.
*G06Q 30/0601* (2023.01)
*G06Q 50/04* (2012.01)

(56) References Cited

U.S. PATENT DOCUMENTS

2014/0236773 A1* 8/2014 Hamilton ............ G06Q 30/0635
  705/26.81
2021/0208573 A1* 7/2021 Gonzalez ................ G06F 40/20

* cited by examiner

FIG 1

METHOD AND SYSTEM FOR REGULATING A MULTI-PART 3D PRINTING ORDER TRANSFER

TECHNICAL FIELD

The present disclosure is directed, in general, to computer-aided design, visualization, and manufacturing ("CAD") systems, product lifecycle management ("PLM") systems, manufacturing order management, product data management ("PDM") systems, sourcing, e-commerce and similar systems, that manage data for products and other items (collectively, "Product Data Management" systems or PDM systems). More specifically, the disclosure is directed to systems related to Additive Manufacturing ("AM") or three-dimensional ("3D") printing.

BACKGROUND OF THE DISCLOSURE

Nowadays AM platforms for 3D printing of custom parts enable to manage one or more of the phases of the printing workflow, for example the phases of part order requests placed by part buyers until the delivery of the parts produced by part suppliers.

Herein, part buyers and part suppliers in the order-to-delivery chain may respectively be referred as requesting units and supplying units. Herein, AM platforms, marketplaces and/or online stores may be referred with the term AM systems. As used herein the term supplier may be referring to a party producing, managing, and/or delivering the requested printing orders. As used herein, the term printing order refers to an order of one or more 3D-printed parts. In the AM domain, a part usually refers to an object or a portion of an object. Herein, terms objects and parts may be used interchangeably. Typically, when a part buyer or customer places a printing order via an AM system, the system receives information on characteristics of the part and information on a range of printing options selectable by the buyer.

As used herein, the terms multi-object printing order or multi-part order denote an order comprising multiple parts of same characteristics. In the art, part characteristics data comprise information on part properties, on part material and on printing technology. For example, they are sometimes defined via files called 3D part files which can describe most of the required part characteristics or which can describe only the part geometry and then other descriptors/files define the metadata. Examples of 3D printing technologies include but are not limited by stereolithography, selective laser sintering, fused deposition modeling, digital light processing.

In AM platforms, a critical workflow phase is the phase of regulating the transfer of a requested printing order by matching the requesting part buyer with a suitable part supplier out of a plurality of several part suppliers potentially available to satisfy the printing of the order parts.

The transfer regulation phase is based on the calculation of suppliers' instant price quotes and delivery lead times for the printing order placed by the buyer. Based on the calculated supplier instant quotes and lead times, AM systems regulate the order transfer by facilitating the match between a requesting unit which placed a printing order to a selected supplying unit which manages the production of the printing order.

In AM systems, for a given printing technology, instant price quotes per part are typically calculated by a price calculating module which is an engine where formulas can be customized by suppliers with own pricing rules and parameters. Instant price quotes formulas usually contain a plurality of costing elements or cost portions e.g. among other they contain production cost portions comprising cost sub-portions for printing the part (e.g. material costs, printer-related costs etc.) and cost sub-portions for post-processing the part (e.g. post-printing operations like finishings, surface coatings and treatments etc).

In AM systems, the printer-related costs are assigned to parts based on the part geometry parameters extracted from the printing file—e.g. part volume e/o bounding box volume—and based on printer job costs according to suppliers' cost metrics profiles per unit of volume of part and/or of bounding box, which is typically based on estimates on average weekly production part thruputs and costs of printing machines, labor e.g. printer washing and printer set up, plus other relevant production parameters and estimates.

For multiple-parts orders, e.g. orders including N parts, suppliers instant quotes are currently determined by additionally applying quantity discount factors definable by the part suppliers on the price per part quotes.

Unfortunately, by applying quantity discount factors to a multi-object order, the calculated supplier instant quote offered to a part buyer may sometimes be too low and the supplier gets a multi-object printing order at a loss when accounting to the production resources effectively employed. Instead, in other cases, the calculated supplier instant quote are too high so that the supplier loses the multi-part printing order which could have generated a gain when accounting the potentially employable printing production resources.

The result is that, unfortunately, in current AM platforms, the order transfer for multi-part orders between a requesting unit and a set of supplying units is not optimally regulated. Improved techniques are therefore desirable.

SUMMARY OF THE DISCLOSURE

Various disclosed embodiments include methods, systems, and computer readable mediums for regulating a multi-part 3D printing order transfer between at least one requesting unit and a plurality of supplying units. A method includes receiving access to a nesting module; said nesting module configured for providing an estimate on a number of parts nestable in a build portion of a job printer of a given technology. The method includes defining a quote price calculation module—herein quote module; said quote module configured for providing a price quote for a printing order based on material cost and on production cost; whereby at least a portion of the production cost is calculated based on required build portion and on selected printing job type. The method includes receiving, for each supplying unit, data on supplier auto-quote profile comprising information for customizing the nesting module and information for customizing the quote module including information on production cost formula rules depending on job type. The method includes receiving data on a multi-part order of N parts requested by the requesting unit. The method includes, for each relevant supplying unit and by using said two modules customized in accordance with the corresponding supplier auto-quote profile, receiving data on a set of available jobs with technology fitting the requested order; identifying in which jobs and in which build portion size of the available jobs a subset of the N parts are nestable by applying the customized nesting module with the identified available printing jobs as module input parameters; calculating a supplier quote to the nestable part subset, by applying the customized quote module—with the identified build portion size and with the type of the identified jobs as module input parameters. The method includes identifying one or more sets of supplying units based on filtering criteria on the corresponding quotes for the requested N-parts order. The method includes regulating the 3D printing order transfer by matching a selected set of supplying units to the requesting unit.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
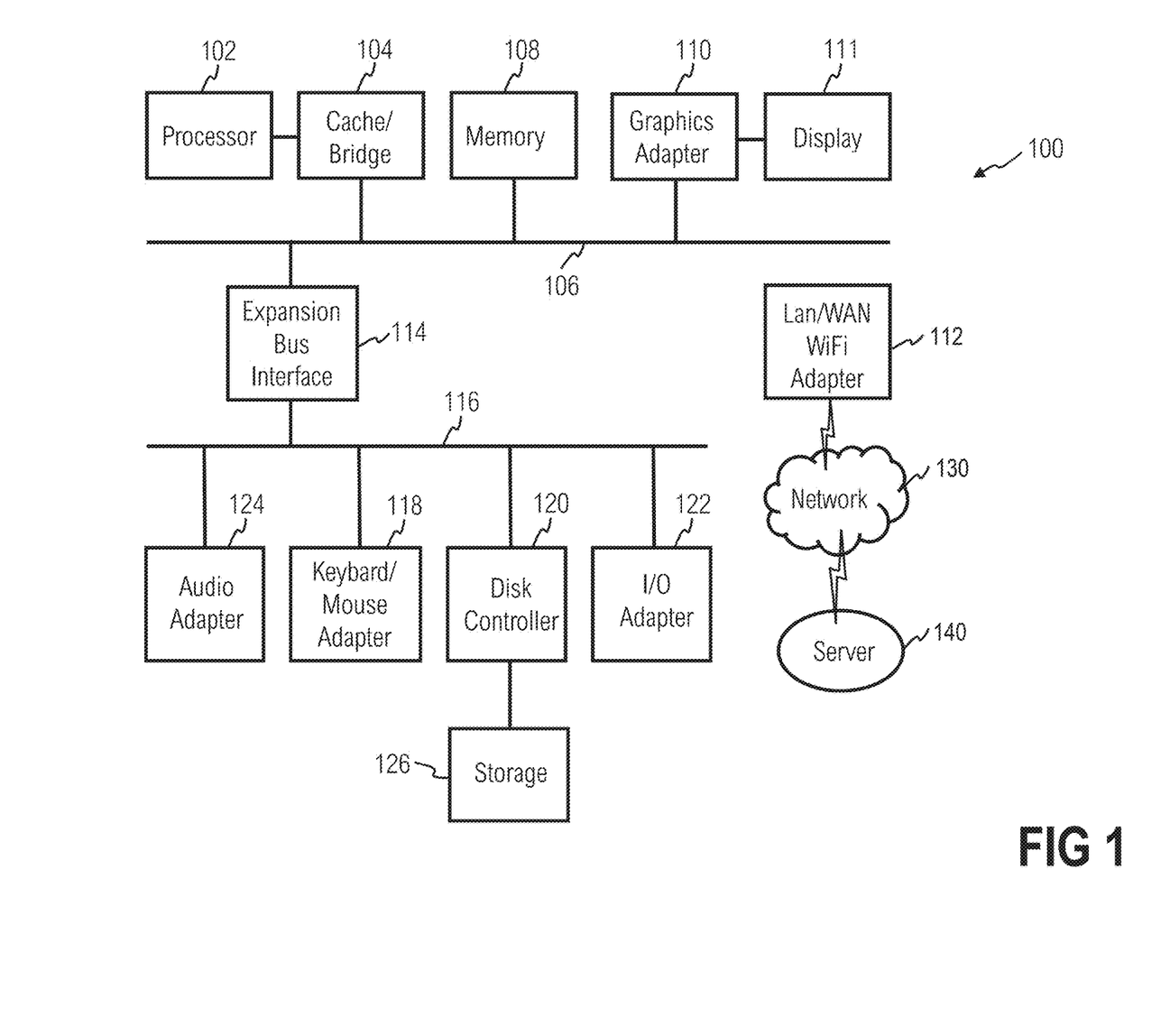
FIG. 1 illustrates a block diagram of a data processing system in which an embodiment can be implemented.
Figure 2:
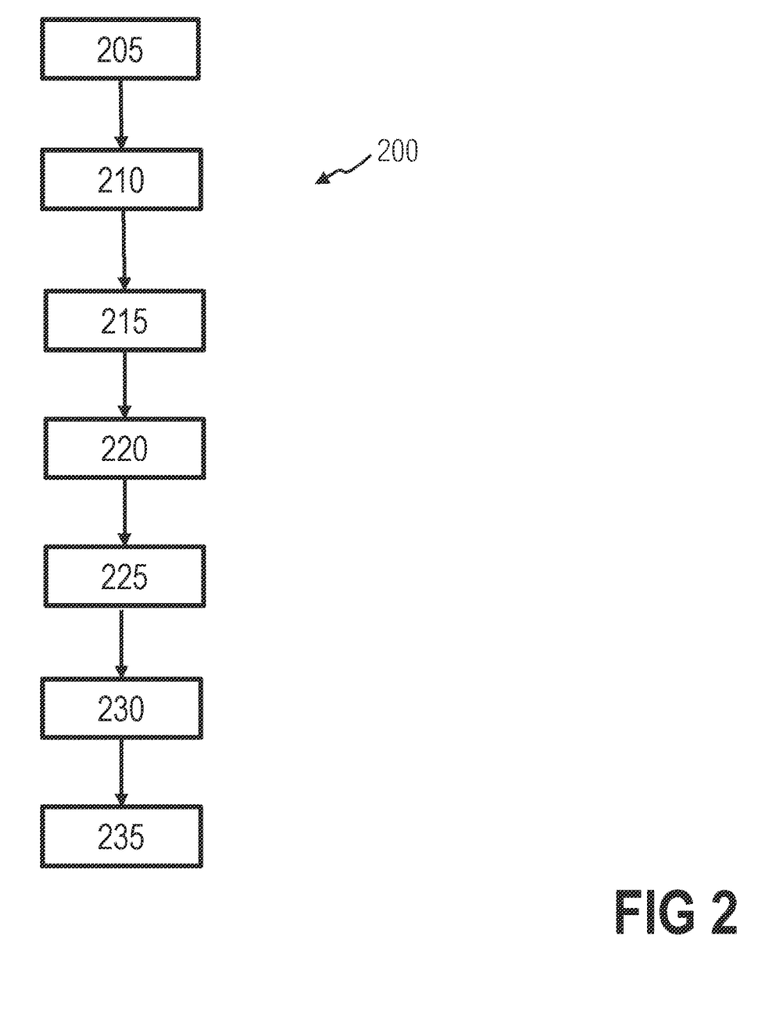
FIG. 2 illustrates a flowchart for regulating a multi-part 3D printing order transfer in accordance with disclosed embodiments.
Figure 3:
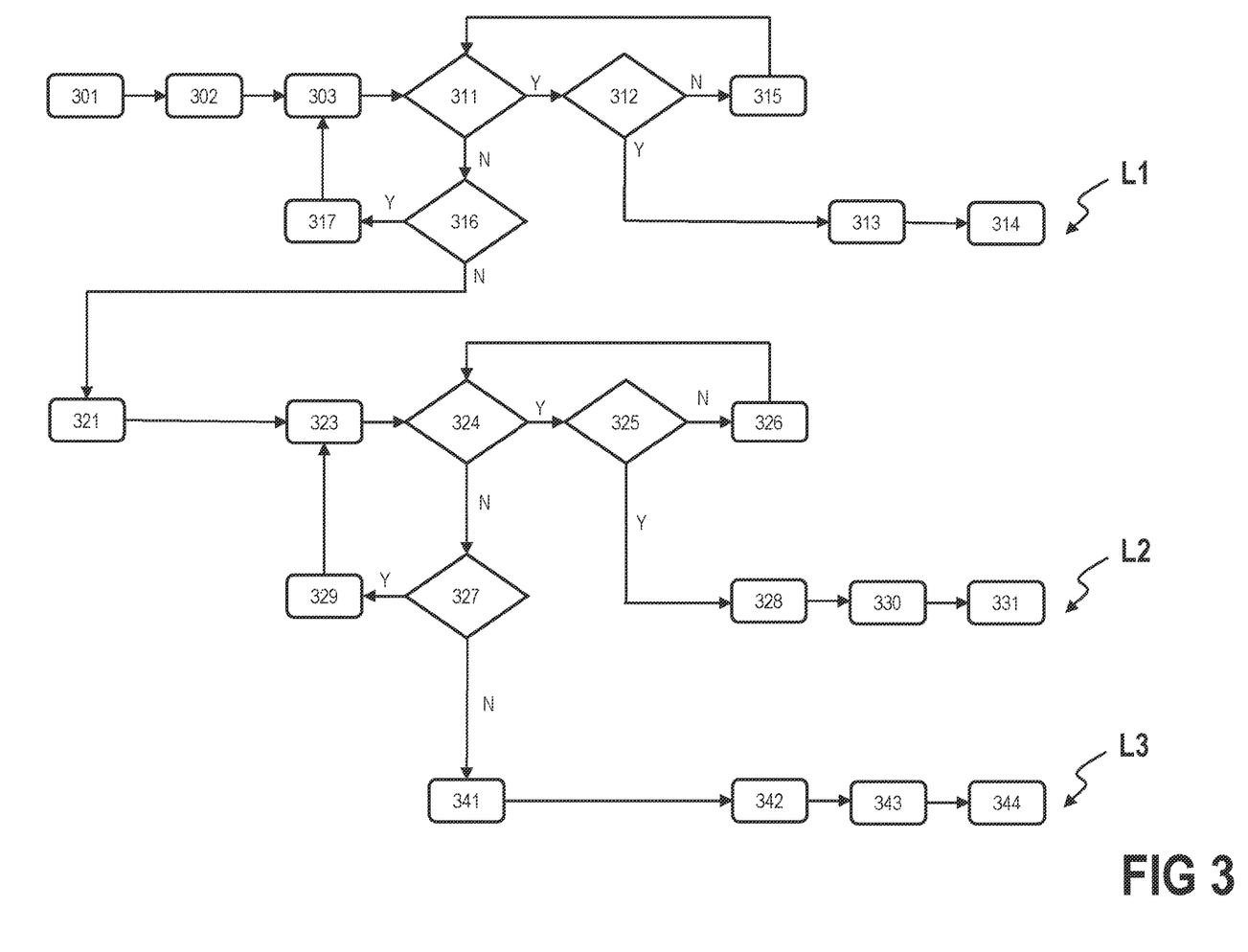
FIG. 3 schematically illustrates a flowchart for regulating a multi-part 3D printing order transfer in accordance with other disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques did not enable to optimally regulating a multi-part 3D printing order transfer.

The embodiments disclosed herein provide numerous technical benefits, including but not limited to the following examples.

With embodiments, the system is able to automatically calculate a price quote based on the available printing jobs at the suppliers. The system is also able to calculate an expected lead time based on the available jobs at the suppliers.

Embodiments enable to dynamically determine a realistic supplier quote offer estimate of a 3D printing order of N parts received by a requesting unit.

With embodiments, the quote price is automatically calculated based on the statuses of available printing jobs per supplier stored within the AM system.

With embodiments, the quote price is dynamically calculated based on actual production statuses at the suppliers.

Embodiments enable determining the available builds with the requested technology and material from printing jobs which are currently under productions, which are planned jobs and/or plannable jobs based on the supplier order statuses.

Embodiments enable suppliers to customize their quote price module with discount rules depending on whether the available jobs are running, planned or to be planned.

Embodiments enable an optimized quote price process which is dynamic and time dependent based on suppliers' production situations and orders backlogs.

Embodiments enable at a given instant to calculate the supplier offer capabilities—quote price and optionally lead time—which better mirror the expected supplier production capabilities.

With embodiments, for a printing order of multiple parts, the price calculation is optimized via nesting so that a competitive quote price proposal may automatically be exposed to the buyer.

With embodiments, the quote to the buyer is provided automatically and on the fly without the need for on-the-fly intervention from the supplier side.

Embodiments provide to suppliers with the capability of customizing their own nesting module specifically for on-the-fly automatic price optimizations.

Embodiments enable to optimize the quote price offering based on predefined supplier preferences.

Embodiments provides the capability of dynamically estimating the cost of printing a requested multi-part order.

Embodiments enable to regulate a 3D printing order transfer by exposing to the requesting unit of a set of offers of a set of supplying units.

Embodiments enable to regulate a 3D printing order transfer based on customer preferences and criteria.

Embodiments enable to optimize the bidding process of AM online stores.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIG. 2 illustrates a flowchart 200 for regulating a multi-part 3D printing order transfer in accordance with disclosed embodiments. Such method can be performed, for example, by system 100 of FIG. 1 described above, but the "system" in the process below can be any apparatus configured to perform a process as described.

The multi-part 3D printing order transfer is regulated between at least one requesting unit and a plurality of supplying units.

At act 205, access to a nesting module is received. The nesting module is configured for providing, via a nesting algorithm, an estimate on a number of parts nestable in a build portion of a job printer of a given technology. As known in the art, a nesting algorithm is an algorithm used in 3D printing for build preparation data whereby the build volume usage is optimized via nesting the parts to be printed in accordance with definable constraints. When applied, a nesting module uses a build optimization function for optimizing the 3D printing build filling—also delivery time and thruput—where the function inputs are the parts to be printed, the build characteristics with desired constraints and the output is the optimized parts nesting. Therefore, the nesting module can be configured to provide an estimate on a number of parts nestable in a build portion, required build portion for nesting a certain number of parts, the largest amount of parts that can fit into a build portion, a job build tray ratio or portion which can fill a certain number of parts, parts density in portion of jobs or similar equivalent parameters. The skilled persons easily appreciate that such output parameters are to be considered similar pr equivalent inputs for the quote module of act 210.

At act 210, a quote price calculation module—herein called quote module is defined. The quote module is configured for providing a price quote for a printing order based on material cost and on production cost, whereby at least a portion of the production cost is calculated based on required build portion and on selected printing job type. In embodiments, also at least a portion of the material cost may be calculated based on required build portion. Advantageously, portions of quote prices may be calculated based on required build portions, on ratio of build costs and on types of available jobs. In embodiments, also portions of post-production costs may be calculated based on required build portion.

At act 215, for each supplying unit, information data on supplier auto-quote profile is received. The supplier auto-quote profile comprises information for customizing the nesting module and information for customizing the quote module including information on production cost formula rules depending on job type. In embodiments, the printing job type is selected from the group consisting of: running job type; planned job type; plannable or yet to be planned job type.

At act 220, the system receives data on a multi-part order of N parts requested by the requesting unit. In embodiments, the data on a multi-part order comprises data on the parts to be printed e.g. part characteristics and properties and data on printing preferences e.g. type of technology, delivery time and/or maximum cost. Examples of part characteristics or properties include, but is not limited by, part geometry, part material, part density and desired quality and other part or material characteristics. As used herein, part characteristics and properties may be used interchangeably and may be simply referred as part parameters.

At act 225, for each relevant supplying unit and by using said two modules customized in accordance with the corresponding supplier auto-quote profile, the following sub-acts are performed:

receiving data on a set of available jobs with technology
    fitting the requested order; whereby, in embodiments, these data may instantly be received and/or may be already available inside the AM system;

identifying in which jobs and in which build portion size of the available jobs a subset of the N parts are nestable by applying the customized nesting module with the identified available printing jobs as module input parameters;

calculating a supplier quote to the nestable part subset, by applying the customized quote module—with the identified build portion size and with the type of the identified jobs as module input parameters.

In embodiments, the job identification is performed according to a prioritization mechanism.

At act 230, one or more sets of supplying units is identified—based on filtering criteria on the corresponding quotes for the requested N-parts order. In embodiments, the identified sets and corresponding quotes may preferably be exposed to a user interface of the requesting unit. Advantageously, in embodiments, the user can review, order and/or select the list of exposed supplier quotes. In embodiments, act 225 further includes the sub-act of calculating a lead time depending on the types of identified jobs and wherein, in act 230, the filtering criteria include the lead time.

In embodiments, act 230 comprises an aggregation of quotes—and optionally lead times—of multiple suppliers across multiple printing machines.

At act 235, the 3D printing order transfer is regulated by matching a selected set of supplying units to the requesting unit. In embodiments, the match is performed automatically on the fly. In embodiments, the matching is done within a time limit based on a pre-defined or dynamically defined deadline for assigning an available job.

In embodiments, the matching is based on a selection based on extremalization/optimization of a target function for example by minimizing cost and/or delivery time.

In embodiments, the nesting and quote modules of the suppliers are customized according to their own corresponding auto-quote profiles. Embodiments enable the suppliers to customize their own discount factors according to types of available jobs—e.g. if they are currently printing, planned and yet to be planned.

Of course, those of skill in the art will recognize that, unless specifically indicated or required by the sequence of operations, certain steps in the processes described above may be omitted, performed concurrently or sequentially, or performed in a different order.

Although exemplary embodiments of AM platforms and 3D printing order scenarios have been described in details, those skilled in the art are able to implement embodiments for other types of AM platforms and 3D printing scenarios.

FIG. 3 schematically illustrates a flowchart for regulating a multi-part 3D printing order transfer in accordance with other disclosed embodiments. The AM system receives, by a requesting unit, a printing order of N-parts.

At act 301, a customer or user requests a quote for a multi-part printing order in the AM system by uploading a 3D printing file and by defining the required quantity of N parts.

At act 302, the AM system finds all print jobs which are currently in production, i.e. running printing jobs, and still have some empty space and are fitting the printing technology and material as defined in the order.

At act 303, the system tries to nest the first part into the upper part of the job which is not printed yet and goes to act 202.

At act 311, the system checks whether it "succeeded in nesting the part?" If "YES", go to act 312, if "NO" go to act 316.

At act 312, the system checks whether "are all parts nested into jobs?" If "YES", go to act 313, if "NO" go to act 315.

At act 313, the system uses reduced pricing rules machine cost for running jobs and calculate delivery date based on lead time.

At act 314, the system presents a first quote price to customer with a limited time to accept depending on jobs left print time.

At act 315, the system tries to nest the next part into the job.

At act 316, the system checks whether "is there another job?" If "YES" go to act 317, if "NO" go to act 322.

At act 317, the system selects the next job and goes back to act 303.

At act 321, the system finds all planned jobs which still have some empty space and are fitting the printing technology and material as defined in the order.

At act 323, the system tries to nest the first part into the first planned job.

At act 324, the system checks whether it "succeeded in nesting the part?" If "YES", go to act 325, if "NO" go to act 327.

At act 325, the system checks whether "are all parts nested into jobs?" If "YES", go to act 328, if "NO" go to act 326.

At act 326, the system tries to nest the next part into the job.

At act 327, the system checks whether "is there another job?" If YES" go to act 329, "NO" goes to act 341.

At act 329, the system selects the next job.

At act 328, the system divides the total build cost by the overall volume of parts calculate the relative cost per part.

At act 330, the system sums up the total new parts cost.

At act 331, the system presents a second quote price to customer with a limited time to respond depending on the jobs left print time.

At act 341, the system calculates the price per part using part pricing rules. At act 342, the system multiplies the part price by the quantity.

At act 343, the system reduces quote price according to a discount rule based on quantity.

At act 344 the system present a third quote price to buyer.

The exemplary flow chart of FIG. 3 can be logically divided for explanatory purposes in three main levels, a first, a second and a third level L1, L2, L3 respectively computing a first, a second, a third quote price for printable parts. In other embodiments, the levels may be more or less than three.

In embodiments, the first quote price may preferably be a premium surcharged price given that the customers benefit of shorter lead times whilst extra production efforts may be required at the supplier sites. In other embodiments, the first quote price may be a best lower price because suppliers are advantageously optimizing their production schedule and are willing to fill the running print build as much as possible with new orders and thus increase their turnover and profit-margins. In fact in this case, additional running machine and human costs are reduced because the printing jobs are already running. Therefore adding orders enable savings in printer operation time for example no need to set up the printers (e.g. heat, open, depowder etc.) or cool it down, productivity is higher given that there is less down time. In embodiments, the extra resource consumptions are therefore reduced beside for the additional printing material which is a variable cost to be added.

Such supplier preferences—e.g. premium surcharged price or best lower price can be defined in advance by the suppliers via the auto-quote profiles. Conveniently, quotes can be automatically calculated on the fly by the quote module and exposed to the buyer without the need of receiving instant inputs on the fly by the suppliers. In embodiments, in order to provide the first quote price also the printing speed is taken into account.

In embodiments, in order to regulate the order transfer by matching a supplier with a first quote price where jobs are currently being printed the matching has to be done within a time limit calculable based on the layer-per minute printer speed.

In embodiments, the second first quote price is a medium price calculated based on available jobs that are planned or that may be planned. Advantageously, the supplier can insert in its corresponding auto-quote profile which quantity discount is to be applied for taking orders in planned or plannable printing jobs.

In embodiments, the third quote price may be a regular price as if no automatic price optimization were made by applying the nesting module and only regular quantity based discount rule are applied on part unit quote prices based on part volume or on part bounding box.

In embodiments, the system checks if there is place across builds, space in one of the existing builds (currently printing or not yet) and it will try to add to the build.

In embodiments, a requesting unit upload a multi-part order and the looks for builds where the parts can be nested and/or defines jobs where the parts can be aggregated and nested.

In embodiments, the data on a set of available jobs with technology fitting the requested order my be already present in the system or it may be received by the suppliers on the fly. For example, at a given instant time t, the available jobs may be received from queuing printing job build data, from existing production statues, from overall requirement and accepted printing orders, planned jobs with free tray space.

Embodiments may include one or more of the following actions.

The system analyses the existing running print jobs and checks—among the ones with free space and with relevant material and technology—whether it can fit the part(s) into one of these jobs by applying a nesting optimization algorithm for nesting the parts into the free tray space of such jobs. In this case, both quote price and delivery/lead time can advantageously be optimized.

If the system cannot find a place for all N-parts in the currently running jobs, the system tries to fit the remaining required parts of the order with the existing accepted orders from other customers, it divides them into groups of same technology and material so that these can be produced together in an optimized build by applying the nesting module. In embodiments, the system checks the available backlog with all part orders coming from other part orders— from same customer or other ones—which have been already approved for production but are not allocated in existing jobs and applies the nesting module for optimization purposes.

For each group, the system applies nesting algorithms based on predefined nesting configurations for that technology as definable in the supplier profile (e.g. density, orientations methodology, etc.), the result is the smallest build size or the largest amount of parts which is required to produce the parts.

In embodiments, the production cost and material cost for producing the allocated build is than calculated based on costing rules for the full build process and the total build cost is then proportionally assigned to build parts according to their volume contribution.

In embodiments, suppliers define their own nesting rules in their own supplier auto-quote profiles e.g. the parameters like the desired distance between parts—e.g. in mm In embodiments, the information defined by the supplier in the auto-quote profile for customizing the nesting module may be same or different from the information used by the suppliers for customizing their nesting modules used in their production for production and scheduling purposes. In fact, the customizations of the nesting module inside the auto-quote profile is used for quote price purposes and given that the quantity of parts which can be nested in a build portion has an impact on calculation of the price quote which can be offered to potential buyers via the AM platform. In fact, such latter nesting customization information may conveniently be more restrictive than the actual production nesting rules and allow to provide a quote with some margins.

In embodiments, the nesting module used in the AM platform for quote calculation purposes may therefore provide a qualitative estimation of the price quote calculation and it may differ from the actual production nesting module used by the supplier for production planning optimization purposes which may for example be located at the edge.

In embodiments, the nesting module and quote module are preferably located in the cloud. Embodiments provide to the suppliers the ability of configuring and customizing their own calculation formulas and rules via their own supplier auto quote profile. In embodiments, supplier auto quote profiles may customized via HMIs with improved UX for example including also via ML/AR/VR tools.

In embodiments, suppliers may decide to expose visual representation of the nesting to a potential buyer.

Embodiments enable an AM platform to act as aggregator between a plurality of buyers and suppliers by checking on multiple available suppliers—where each supplier has its own rules and preferences —, it calculates per suppliers a quote and optionally a lead time, and it finds the best match for example via an automatic filtering mechanism by assigning weights or scores. Embodiments enable concurrent and parallel quotes.

In embodiments, the nesting module is the same nesting module used by the supplier for planning purposes. Advantageously, the same logic is used for automatically quoting soon after a buyer uploads a printing file for N-parts into the AM system.

In embodiments, the AM platform is located in the cloud.

Although exemplary embodiments of AM platforms and 3D printing order scenarios have been described in details, those skilled in the art are able to implement embodiments for other types of AM platforms and 3D printing scenarios.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for regulating a multi-part 3D printing order transfer between at least one requesting unit and a plurality of supplying units, the method comprising the following steps:
    a) receiving access to a nesting module; said nesting module configured for providing an estimate on a number of parts nestable in a build portion of a job printer of a given technology;
    b) defining a quote price calculation module—herein quote module; said quote module configured for providing a price quote for a printing order based on material cost and on production cost; whereby at least a portion of the production cost is calculated based on required build portion and on selected printing job type;
    c) for each supplying unit, receiving data on supplier auto-quote profile comprising information for customizing the nesting module and information for customizing the quote module including information on production cost formula rules depending on job type;
    d) receiving data on a multi-part order of N parts requested by the requesting unit;
    e) for each relevant supplying unit and by using said two modules customized in accordance with the corresponding supplier auto-quote profile, performing the following sub-steps:
        e1) receiving data on a set of available jobs with technology fitting the requested order;
        e2) identifying in which jobs and in which build portion size of the available jobs a subset of the N parts are nestable by applying the customized nesting module with the identified available printing jobs as module input parameters;
        e3) calculating a supplier quote to the nestable part subset by applying the customized quote module—with the identified build portion size and with the type of the identified jobs as module input parameters;
    f) identifying one or more sets of supplying units based on filtering criteria on the corresponding quotes for the requested N-parts order;
    g) regulating the 3D printing order transfer by matching a selected set of supplying units to the requesting unit.

2. The method of claim 1, wherein the printing job type are selected from the group consisting of:
    running job type;
    planned job type;
    plannable job type.

3. The method of claim 1, wherein step e) further includes the sub-step of calculating a lead time depending on the types of identified jobs and wherein in step f) the filtering criteria include the lead time.

4. The method of claim 1, wherein in step e) the matching is done within a time limit based on a deadline for assigning an available job.

5. The method of claim 1, wherein step f) comprises an aggregation of quotes of multiple suppliers across multiple printing machines.

6. The method of claim 1, wherein in step b) at least a portion of the material cost is calculated based on required build portion.

7. A data processing system comprising:
    a processor; and
    an accessible memory, the data processing system particularly configured to:
        a) receive access to a nesting module; said nesting module configured for providing an estimate on a number of parts nestable in a build portion of a job printer of a given technology;
        b) define a quote price calculation module—herein quote module; said quote module configured for providing a price quote for a printing order based on material cost and on production cost; whereby at least a portion of the production cost is calculated based on required build portion and on selected printing job type;
        c) for each supplying unit, receive data on supplier auto-quote profile comprising information for customizing the nesting module and information for customizing the quote module including information on production cost formula rules depending on job type;
        d) receive data on a multi-part order of N parts requested by the requesting unit;
        e) for each relevant supplying unit and by using said two modules customized in accordance with the corresponding supplier auto-quote profile, configured to perform the following:
            e1) receive data on a set of available jobs with technology fitting the requested order;
            e2) identify in which jobs and in which build portion size of the available jobs a subset of the N parts are nestable by applying the customized nesting module with the identified available printing jobs as module input parameters;
            e3) calculate a supplier quote to the nestable part subset by applying the customized quote module—with the identified build portion size and with the type of the identified jobs as module input parameters;
        f) identify one or more sets of supplying units based on filtering criteria on the corresponding quotes for the requested N-parts order;

g) regulate the 3D printing order transfer by matching a selected set of supplying units to the requesting unit.

8. The data processing system of claim 7, wherein item e) further includes the sub-item of calculate a lead time depending on the types of identified jobs and wherein in item f) the filtering criteria include the lead time.

9. The data processing system of claim 7, wherein in item g) the matching is done within a time limit based on a deadline for assigning an available job.

10. The data processing system of claim 7, wherein item f) comprises an aggregation of quotes of multiple suppliers across multiple printing machines.

11. The data processing system of claim 7, wherein in item b) at least a portion of the material cost is calculated based on required build portion.

12. A non-transitory computer-readable medium encoded with executable instructions that, when executed, cause one or more data processing system to:
- a) receive access to a nesting module; said nesting module configured for providing an estimate on a number of parts nestable in a build portion of a job printer of a given technology;
- b) define a quote price calculation module—herein quote module; said quote module configured for providing a price quote for a printing order based on material cost and on production cost; whereby at least a portion of the production cost is calculated based on required build portion and on selected printing job type;
- c) for each supplying unit, receive data on supplier auto-quote profile comprising information for customizing the nesting module and information for customizing the quote module including information on production cost formula rules depending on job type;
- d) receive data on a multi-part order of N parts requested by the requesting unit;
- e) for each relevant supplying unit and by using said two modules customized in accordance with the corresponding supplier auto-quote profile, configured to perform the following:
  - e1) receive data on a set of available jobs with technology fitting the requested order;
  - e2) identify in which jobs and in which build portion size of the available jobs a subset of the N parts are nestable by applying the customized nesting module with the identified available printing jobs as module input parameters;
  - e3) calculate a supplier quote to the nestable part subset by applying the customized quote module—with the identified build portion size and with the type of the identified jobs as module input parameters;
- f) identify one or more sets of supplying units based on filtering criteria on the corresponding quotes for the requested N-parts order;
- g) regulate the 3D printing order transfer by matching a selected set of supplying units to the requesting unit.

13. The non-transitory computer-readable medium of claim 12, wherein item e) further includes the sub-item of calculate a lead time depending on the types of identified jobs and wherein in item f) the filtering criteria include the lead time.

14. The non-transitory computer-readable medium of claim 12, wherein in item g) the matching is done within a time limit based on a deadline for assigning an available job.

15. The non-transitory computer-readable medium of claim 12, wherein in item f) comprises an aggregation of quotes of multiple suppliers across multiple printing machines.

16. The non-transitory computer-readable medium of claim 12, wherein in item b) at least a portion of the material cost is calculated based on required build portion.

* * * * *